(12) United States Patent
Tso et al.

(10) Patent No.: US 11,835,259 B2
(45) Date of Patent: Dec. 5, 2023

(54) SELF-REGENERATED HYBRID DEHUMIDIFIER WITH AIR PURIFICATION

(71) Applicant: City University of Hong Kong, Hong Kong (HK)

(72) Inventors: Chi Yan Tso, Hong Kong (HK); Hau Him Lee, Hong Kong (HK); Siru Chen, Hong Kong (HK); Tsz Chung Ho, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 315 days.

(21) Appl. No.: 17/347,622

(22) Filed: Jun. 15, 2021

(65) Prior Publication Data
US 2021/0389000 A1 Dec. 16, 2021

Related U.S. Application Data

(60) Provisional application No. 63/039,536, filed on Jun. 16, 2020.

(51) Int. Cl.
*F24F 8/10* (2021.01)
*F24F 11/00* (2018.01)
(Continued)

(52) U.S. Cl.
CPC ............ *F24F 8/10* (2021.01); *B01D 53/0438* (2013.01); *B01D 53/261* (2013.01);
(Continued)

(58) Field of Classification Search
CPC .... F24F 11/0008; F24F 12/00; F24F 2110/20; F24F 2203/12; F24F 2003/144; F24F 2003/1452; B01D 53/0438
See application file for complete search history.

(56) References Cited

U.S. PATENT DOCUMENTS 5,727,394 A * 3/1998 Belding ................ F24F 1/0043
62/304
6,378,311 B1 4/2002 McCordic
(Continued)

FOREIGN PATENT DOCUMENTS

CN 200986346 Y 12/2007
CN 205783494 U 12/2016
(Continued)

OTHER PUBLICATIONS

L.Q. Zhu et al., "Performance investigation of nanostructured composite surfaces for use in adsorption cooling systems with a mass recovery cycle", Science and Technology for the Built Environment; 2018, vol. 24 (10), pp. 1084~1103.

*Primary Examiner* — Lionel Nouketcha
(74) *Attorney, Agent, or Firm* — Idea Intellectual Limited; Margaret A. Burke; Sam T. Yip (57) ABSTRACT

The present invention provides an integrated system of moisture removal, air purification, and air ventilation of the process air while some of the energy and resources required for operation of the system are self-sustained, or in some aspects the present system is self-regenerated such as heating and cooling of air and water exchanged among various elements/modules/members within the system or between the system and the surroundings, such that it becomes an all-time and all-round air dehumidifier, purifier and ventilator. Related method for removing air moisture from the surroundings using the present system is also provided.

20 Claims, 4 Drawing Sheets

(51) Int. Cl.
*F24F 12/00* (2006.01)
*B01D 53/26* (2006.01)
*B01D 53/04* (2006.01)
*F24F 110/20* (2018.01)

(52) U.S. Cl.
CPC .......... *F24F 11/0008* (2013.01); *F24F 12/00* (2013.01); *B01D 2253/106* (2013.01); *B01D 2253/25* (2013.01); *B01D 2257/80* (2013.01); *B01D 2259/4009* (2013.01); *F24F 2110/20* (2018.01); *F24F 2203/12* (2013.01)

(56) References Cited

U.S. PATENT DOCUMENTS

| | | |
|---|---|---|
| 9,146,040 B2 * | 9/2015 | DeValve ................ B01D 53/06 |
| 2018/0094823 A1 | 4/2018 | Lee et al. |
| 2018/0313553 A1 | 11/2018 | Ma et al. |

FOREIGN PATENT DOCUMENTS

| | | |
|---|---|---|
| CN | 105698584 B | 1/2018 |
| CN | 107621023 B | 9/2019 |

* cited by examiner

SELF-REGENERATED HYBRID DEHUMIDIFIER WITH AIR PURIFICATION

CROSS-REFERENCE WITH RELATED APPLICATIONS

The present application claims priority from the U.S. Provisional Patent Application No. 63/039,536 filed Jun. 16, 2020, and the disclosure of which is incorporated herein by reference in its entirety.

FIELD OF THE INVENTION

The present invention relates to a hybrid dehumidifier. In particular, the present invention relates to a combination of dew point condensation dehumidification and chemical-based dehumidification mechanisms to exert a synergistic effect on dehumidification while heat generated and water collected during the dehumidification serve as a source of drying the chemical adsorbent and coolant of a thermal conductive assembly in the dehumidifier, leading to self-regeneration of the dehumidifier.

BACKGROUND

Dehumidifier is mainly used to adjust the indoor air humidity and provide a comfortable living environment. Besides, it is also used in the office field and special business environments. Dehumidifiers can normally be classified into household dehumidifiers and industrial dehumidifiers according to the purpose, humidity level of the environment where the dehumidifiers are used, etc. An ZDC's survey data on the dehumidifier market in the third quarter of 2017 shows that Chinese users' attention to industrial dehumidifiers reached 78.6%, while household dehumidifiers accounted for 21.4%. This is because industrial dehumidifiers have become more and more important to different industries ranging from food, medicine, papermaking, printing, tobacco, wine, tea, packaging, storage, and manufacturing of electronics.

According to the "2018 Global and Chinese Dehumidifier Market Research Report", in 2017, the global dehumidifier market size reached US$1.549 billion and is expected to reach US$1.986 billion in 2025, with a compound annual growth rate (CAGR) of 3.16%. According to the "2018-2022 China Dehumidifier Industry Market Development Status and Production Data Analysis Report", it shows that in 2017, China's dehumidifier market sales were 1.49 million units and the retail scale was US$290 million. In the first half of 2018, the retail scale of dehumidifiers was US$166 million with the CAGR of 7.9%. It can be seen that mainland China in the dehumidifier industry accounted for a large proportion. Dehumidifier industry in China also develops rapidly in recent years.

In addition to mainland China, the dehumidifier industry in other markets also has a lot of potentials. According to data from the global sales survey of dehumidifiers in 2015, the market penetration of dehumidifiers in developed countries such as Europe and the United States has reached more than 30%; South Korea: 29%; Japan: 28%; Taiwan China: 68%; and Hong Kong: 55%.

China's position in the global dehumidifier market is becoming increasingly significant, especially for the coastal areas of Southern China. Due to geographical and climatic factors, these regions have heavy annual rainfall and high humidity, which makes dehumidifiers extremely important in these regions. Therefore, the dehumidifiers have sales potential in this area.

Moreover, these coastal areas have developed economies, and there are many large-scale production plants, hospitals, food industries, import and export trade warehouses, etc. that need to use dehumidifiers.

One of the most common dehumidification mechanisms in the conventional dehumidifiers is mechanical dehumidification, also known as condensation dehumidification. Moist air, or called process air, when it is cooled below its dew point, condensation of the moisture on cool surface of below the dew point occurs. Under a dry air circumstance, because this kind of conventional dehumidifiers over-cools the air, re-heating thereof is required before discharging thereof to an indoor environment, increasing energy consumption, lowering efficiency and increasing the operational cost.

In a situation where ambient air is relatively cool while the relative humidity is very high, e.g., during the transition between winter and spring in the Southern China region, the dehumidification efficiency of conventional dehumidifiers using this kind of mechanical or condensation dehumidification mechanism is relatively low because extra energy is wasted on cooling the process air due to the limitation of the mechanism. Another drawback is the possible build-up of frost on the cool surface where condensation occurs such as on a surface of a cooling coil, which leads to low dehumidification efficiency and high energy consumption.

JP475122B1 disclosed a dehumidifier including a hygroscopic filter having hydrophilic inorganic materials such as zeolite, silica gels, etc., to absorb moisture in air, and the absorbed water is recovered by a means using heat to become water vapor.

U.S. Pat. No. 6,442,951B1 disclosed a dehumidifier including a moisture absorber having a desiccant for absorbing moisture from the process air. However, it also involves the use of refrigerant during the vapor compression process which is an environmental unfriendly process.

U.S. Pat. No. 10,486,102B2 disclosed a moisture removal/water harvesting material including hydrophilic micropores-containing material and a low water activity material, where the hydrophilic material can be a superhydrophilic material.

CN106705334A disclosed a fresh air handling system including an energy storage a phase change material to store heat generated by thermoelectric cooler for regeneration of the adsorbent.

However, none of the foregoing references provide an integrated system that is absent in any environmental unfriendly refrigerant or coolant, or efficiently dehumidify incoming air from the surroundings in a self-sustained and self-regenerated manner, i.e., fully utilize the heat generated during dehumidification in condensation of water based on both dew point condensation and chemical-based condensation mechanisms.

Therefore, there is an unmet need to provide such an integrated system which is suitable for both domestic and industrial scale of dehumidification and also with other functions such as air purification and ventilation, aiming at using environmental friendly chemicals/compounds for chemical-based condensation while taking into account of how to synergistically remove moisture from the incoming air in a self-regenerated manner.

SUMMARY OF THE INVENTION

To address the aforementioned shortcomings, the present invention provides an integrated system of moisture removal, air purification, and air ventilation of the process air while some of the energy and resources required for operation of the system are self-sustained, or in some aspects the present system is self-regenerated such as heating and cooling of air and water exchanged among various elements/modules/members within the system or between the system and the surroundings, such that it becomes an all-time and all-round air dehumidifier, purifier and ventilator.

In a first aspect, the present invention relates to a system mainly for moisture removal from process air being ventilated into the system from its surroundings. At the same time, in the presence of a high efficiency particulate air (HEPA) filter disposed adjacent to a gas inlet of the system, the present system also serves as an air purifier apart from its dehumidification function. The system includes:

an enclosure including at least one gas inlet and one gas outlet, and the followings:

a plurality of thermal conductive elements having at least one superhydrophilic-nanostructured composite surface and composite adsorbent;

at least one heat storage member;

at least one thermoelectric heating and cooling module communicating with the plurality of thermal conductive elements and the at least one heat storage member, respectively, forming at least two water circulations within the enclosure; and at least one high efficiency particulate air filter disposed adjacent to the at least one gas inlet;

wherein the process air is ventilated into the system through the at least one gas inlet, passes through the at least one high efficiency particulate air filter, followed by passing through the plurality of thermal conductive elements to contact the at least one superhydrophilic-nanostructured composite surface and water adsorbent arranged in a manner to result in a maximum surface area of the plurality of thermal conductive elements to be in contact with the process air ventilated into the system in order to reach a maximum efficiency of moisture removal while heat generated from water of the at least one thermoelectric heating and cooling module is stored in the at least one heat storage member and the heat stored in the at least one heat storage member is capable of changing the state of material in the at least one heat storage member and providing heat to the water of the at least one thermoelectric heating and cooling module when needed, wherein moisture from the process air is condensed on the at least one superhydrophilic-nanostructured composite surface when the process air passes through or contacts the at least one superhydrophilic-nanostructured composite surface due to a temperature of the at least one superhydrophilic-nanostructured composite surface being below dew point temperature and/or at least a compound of the composite adsorbent absorbs water molecules from the moisture, and water condensed on said at least one superhydrophilic-nanostructured composite surface is collected by a water collection member disposed in the enclosure where condensed water on said surface will fall due to gravity.

In accordance with an embodiment, the at least one superhydrophilic-nanostructured composite surface has a water contact angle of less than 10 degrees.

In accordance with an embodiment, the at least one superhydrophilic-nanostructured composite surface comprises at least one photo-induced compound in order to exert photocatalytic superhydrophilicity to the at least one superhydrophilic-nanostructured composite surface.

In accordance with an embodiment, the at least one photo-induced compound comprises titanium dioxide.

In accordance with an embodiment, the at least one superhydrophilic-nanostructured composite surface comprises at least a metal deposited electrochemically and sintered to exert superhydrophilicity.

In accordance with an embodiment, the at least a metal comprises copper.

In accordance with an embodiment, the at least one superhydrophilic-nanostructured composite surface comprises at least a metal substrate developed by dip-coating.

In accordance with an embodiment, the at least a metal substrate comprises a copper substrate.

In accordance with an embodiment, the composite adsorbent comprises carbon nanotube, zeolite, calcium chloride, silica gel, activated carbon, or any combination thereof.

In accordance with an embodiment, the composite adsorbent is coated on the at least one superhydrophilic-nanostructured composite surface by spraying or electrostatic coating.

In accordance with an embodiment, the plurality of thermal conductive elements is arranged to form tubular, shell, double pipe, hairpin, flat plate, fin, radiator, spiral structure, serpentine-shaped, or any combination thereof, to maximize solid-liquid contact area of the superhydrophilic-nanostructured composite surface.

In accordance with an embodiment, a first ventilation fan is disposed in the enclosure along a first air pathway for ventilating the process air from outside the enclosure through the gas inlet, subsequently through the at least one high efficiency particulate air filter, followed by contacting the at least one superhydrophilic-nanostructured composite surface and the composite adsorbent of the plurality of the thermal conductive elements, before the process air being discharged from the enclosure through the gas outlet to the exterior of the enclosure.

In accordance with an embodiment, a second ventilation fan is disposed in where hot air generated from the at least one heat storage member is directed towards the plurality of thermal conductive elements so that heat from the hot air is utilized to heat up the surface thereof so that water molecules absorbed by the composite adsorbent are released from the composite absorbent to the relatively colder superhydrophilic-nanostructured composite surface.

In accordance with one embodiment, the material in the at least one heat storage member comprises a phase-change material. Preferably, the phase-change material in certain embodiments comprises paraffin, salt hydrates, sodium sulfate, or any combination thereof.

In a second aspect, the present invention provides self-regenerated method for removing moisture from process air. The present method can be substantially divided into two-folds: the first is when the incoming process air which is humid contacts the superhydrophilic-nanostructured composite surface which is below dew point temperature of water molecules, moisture will condense on said surface; the second is when one or more chemical-based adsorbents coated on said surface is in contact with the incoming process air, water molecules will be absorbed by the one or more chemical-based adsorbents. The plurality of thermal conductive elements is configured in favor of the collection of water droplets by a water collection member disposed underneath the thermal conductive elements so that when the condensed water droplets on said surface fall due to gravity, the water will be collected by said water collection member. The present method includes mainly the followings:

providing an enclosure where the process air is treated;

first ventilating the process air from a gas inlet of the enclosure through an air pathway to reach a plurality of thermal conductive elements;

providing a maximum total surface area of a superhydrophilic-nanostructured composite surface coated with one or more chemical-based adsorbents on the plurality of thermal conductive elements to be disposed within the enclosure in an orientation substantially perpendicular to the direction of air flow in the air pathway from the gas inlet in order to maximize contact rate per surface area of the superhydrophilic-nanostructured composite surface to a volume of incoming process air;

providing a thermoelectric heater and cooler module having at least two water circulations respectively communicating with a liquid section of the plurality of the thermal conductive elements and with a heat storage member, one end of the liquid section of the thermal conductive elements more proximal to the superhydrophilic-nanostructured composite surface receiving a relatively cool water from the thermoelectric heater and cooler module while the other end of the liquid section of the thermal conductive elements more distal to the superhydrophilic-nanostructured composite surface transferring a relatively warm water to the thermoelectric heater and cooler module; the heat storage member including a material responsive to temperature change when the temperature of the water from the thermoelectric heater and cooler module exceeds a phase-transition temperature of said material of the heat storage member such that said material is converted from solid state into liquid state;

second ventilating the air in the enclosure towards a direction which a maximum air flow rate first flowing through the heat storage member to carry away heat from said material of the heat storage member after being converted into liquid state followed by flowing through multiple gaps between each pair of two different vertical planes of the thermal conductive elements is provided to elevate the surface temperature of the superhydrophilic-nanostructured composite surface such that water molecules from the incoming process air absorbed by the one or more chemical-based adsorbents are ready to be released from the chemical-based adsorbents;

after said second ventilated air passing through the material of the heat storage member having been converted from solid to liquid state thereof by the relatively warm water at a temperature exceeding the phase-transition temperature of the material from the thermoelectric heater and cooler module, transferring the water after cooling by the said ventilated air from the heat storage member back to the thermoelectric heater and cooler module in order to circulate a relatively cool water to the end of the liquid section of the plurality of thermal conductive elements more proximal to the superhydrophilic-nanostructured composite surface where incoming process air after passing through the gas inlet will first contact with;

cooling the superhydrophilic-nanostructured composite surface by the relatively cool water from the thermoelectric heater and cooler module to the liquid section of the plurality of the thermal conductive elements such that the proximal end of the plurality of the thermal conductive elements to the superhydrophilic-nanostructured composite surface maintains a surface temperature below dew point temperature of the water molecules in the incoming process air.

In one embodiment, the plurality of thermal conductive elements is configured to have a cross-section which maximizes the contact area of the incoming process air ventilated by a first ventilation fan from the gas inlet through the air pathway and/or the air ventilated by a second ventilation fan from the heat storage member with the superhydrophilic-nanostructured composite surface coated with the one or more chemical-based adsorbents.

In one embodiment, the water temperature flowing through the proximal end of the liquid section of the thermal conductive elements to the superhydrophilic-nanostructured composite surface where the incoming process air is first in contact with is kept supplying at below dew point temperature of water molecules from the thermoelectric heater and cooler module through a first pump in order to maintain the surface temperature of said surface be lower than the dew point temperature to realize dew point condensation mechanism.

In one embodiment, the air directed by the second ventilation fan to carry away heat from the one or more materials of the heat storage member after the materials of the heat storage member have been converted from solid to liquid state by the relatively warm water from the thermoelectric heater and cooler module is above the dew point temperature of the water molecules in order to facilitate the dissociation of the water molecules from the one or more chemical-based adsorbents coated on the superhydrophilic-nanostructured composite surface in order to regenerate the one or more chemical-based adsorbents ready for subsequent rounds of chemical-based condensation.

In one embodiment, the superhydrophilic-nanostructured composite surface is provided by electrochemical deposition or dip-coating of at least one metal to form a metal substrate, followed by electrostatic coating the one or more chemical-based adsorbents by spraying a solution containing the one or more chemical-based adsorbents or by other possible deposition method in order to form a coating of the one or more chemical-based adsorbents on the composite surface.

In a preferred embodiment, the at least one metal or metal substrate of the superhydrophilic-nanostructured composite surface is copper or copper compound.

In an embodiment, copper substrate or plate is polished or electrochemically deposited with a copper compound followed by sintering to obtain the superhydrophilic-nanostructured composite surface.

In an embodiment, the superhydrophilic-nanostructured composite surface comprises a photocatalytic compound being coated thereon after the formation of the superhydrophilic surface.

In a preferred embodiment, the photocatalytic compound comprises titanium dioxide.

The present method can also be enabled by using the system in the first aspect with variations described herein which should still be within the spirit and objectives of the present invention.

BRIEF DESCRIPTION OF THE DRAWINGS

Embodiments of the invention are described in more details hereinafter with reference to the drawings, in which.

DETAILED DESCRIPTION OF THE INVENTION

In the following description, systems, devices, methods of removing moisture from process air, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It should be apparent to practitioner skilled in the art that the foregoing examples of the system and method are only for the purposes of illustration of working principle of the present invention. It is not intended to be exhaustive or to limit the invention to the precise forms disclosed.

In accordance with various embodiments of the present invention, the present system is an integrated system of moisture removal, air purification, and air ventilation of the process air while some of the energy and resources required for operation of the system are self-sustained, or in some aspects the present system is self-regenerated such as heating and cooling of air and water exchanged among various elements/modules/members within the system or between the system and the surroundings.

Figure 1:
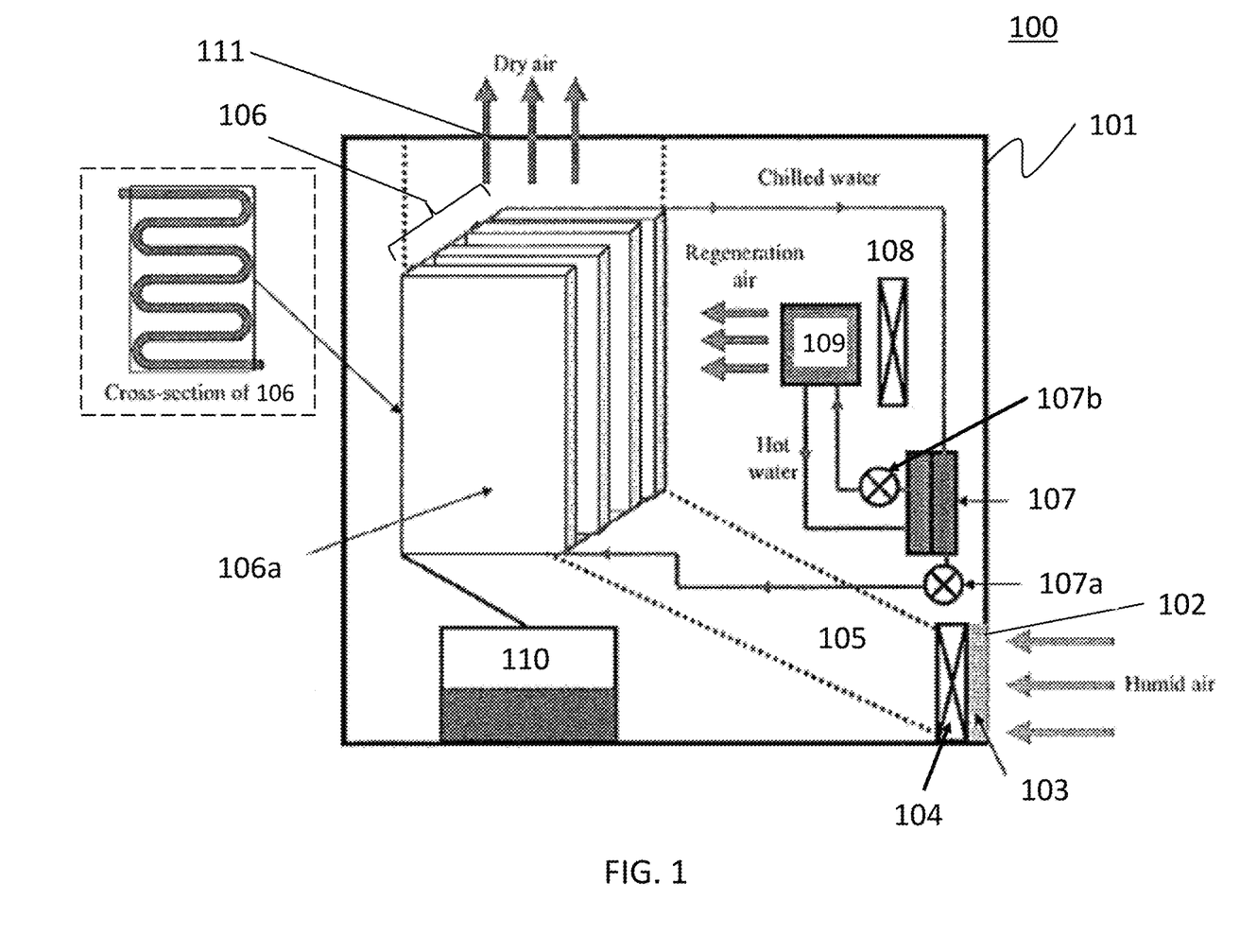
FIG. 1 schematically depict the structure of the system according to an embodiment of the present invention.

Turning to FIG. 1, there is provided a system 100 according to an embodiment of the present invention including an enclosure 101, in which there is at least one gas inlet 102 where humid (or process) air is ventilated from the surroundings into the system. In this example, a high efficiency particulate air (HEPA) filter 103 is disposed right at the gas inlet 102 so that when the process air first enters into the system, it first passes through the HEPA filter 103, then a first ventilation fan 104 disposed adjacent to the HEPA filter directs the filtered air to a first air pathway 105 which is an air duct communicating with a plurality of thermal conductive elements 106, which is a plurality of heat exchangers with a serpentine-shaped cross-section where liquid section of the heat exchangers are configured. The plurality of thermal conductive elements 106 also communicates with a thermoelectric heater and cooler module 107 where one end of the thermoelectric heater and cooler module 107 circulates a relatively cooler water to the plurality of thermal conductive elements 106 by a first pump 107a so that the superhydrophilic-nanostructured composite surface 106a can have a temperature below dew point temperature to condense the moisture from the process air from the air pathway 105. The circulated water from the thermoelectric heater and cooler module 107, after passing through the serpentine-shaped liquid section of the plurality of thermal conductive elements 106, is re-circulated back to the thermoelectric heater and cooler module 107. Heat carried away by the water re-circulated from the plurality of the thermal conductive elements 106 back to the thermoelectric heater and cooler module 107 is stored in a heat storage member 109. "Chilled water" indicated in FIG. 1 is not characterized by the temperature of the water, but is from which origin the water is re-circulated. In this context, "chilled water" refers to the water re-circulated from the plurality of the thermal conductive elements 106 (or heat exchangers which are used interchangeably in some examples in the present invention) to the thermoelectric heater and cooler module 107.

Analogously, the expression of "hot water" in FIG. 1 is not characterized by the temperature of the water, but only for indicating the origin of the water. As used herein, "hot water" in FIG. 1 stands for water from the heat storage member 109 to the thermoelectric heater and cooler module 107. The relatively hot water from the thermoelectric heater and cooler module 107 to the heat storage member 109 changes the state of materials in the heat storage member 109. In this example, the materials comprised in the heat storage member 109 is one or more phase change materials having a phase-transition temperature water which is about or slightly below the temperature of the re-circulated water coming from the plurality of the thermal conductive elements 106 and pumped by a second pump 107b of the thermoelectric heater and cooler module 107. The one or more phase change materials in the heat storage member 109, after absorbing the heat from the re-circulated water, is/are changed from solid to liquid state. An operation of a second ventilation fan 108 is triggered such that heat stored in the heat storage member 109 because of the heat from the re-circulated water from the plurality of the thermal conductive elements is carried away by air ventilated by the second ventilation fan 108. In this example, the air coming from the heat storage member 109 and ventilated by the second ventilation fan 108 is labelled as regeneration air which is relatively warmer and at a temperature of the regeneration air that is sufficient to desorb the water molecules from the compound and/or metal of the composite adsorbent. The second ventilation fan 108, and/or the first ventilation fan 104, or even the first and second pumps (107a, 107b) in the present invention can be triggered by a sensing mechanism to the respective temperature of the heat storage member and/or the other components in the present system, or manually when needed, or any other mechanism according to the application and/or need of the user of the present system. One of the criteria for the operation of these components is to ensure that the present system is operated in the most energy-efficient manner.

Water molecules released from the composite adsorbent due to the contact with the regeneration air and/or the water condensed on the superhydrophilic-nanostructured composite surface 106a due to the dew point condensation mechanism in the presence of relatively cool water flowing through the liquid section of the plurality of the thermal conductive elements is/are collected by a water collection tank 110 disposed underneath the plurality of the thermal conductive elements 106 and in an orientation where water droplets will be formed and fall into a direction due to gravity.

Figure 2:
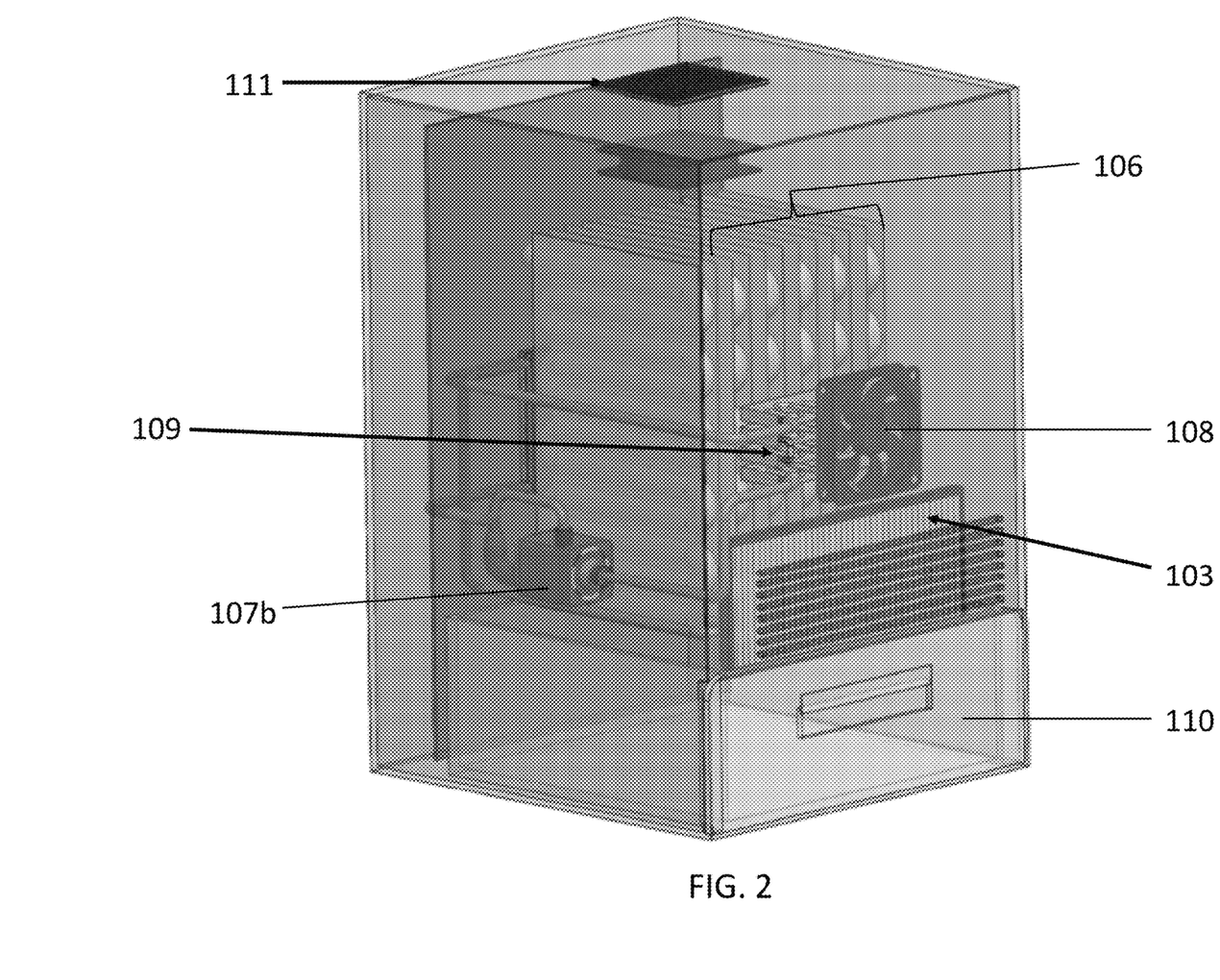
FIG. 2 is a perspective transparent view of the system according to an embodiment of the present invention.
Figure 3:
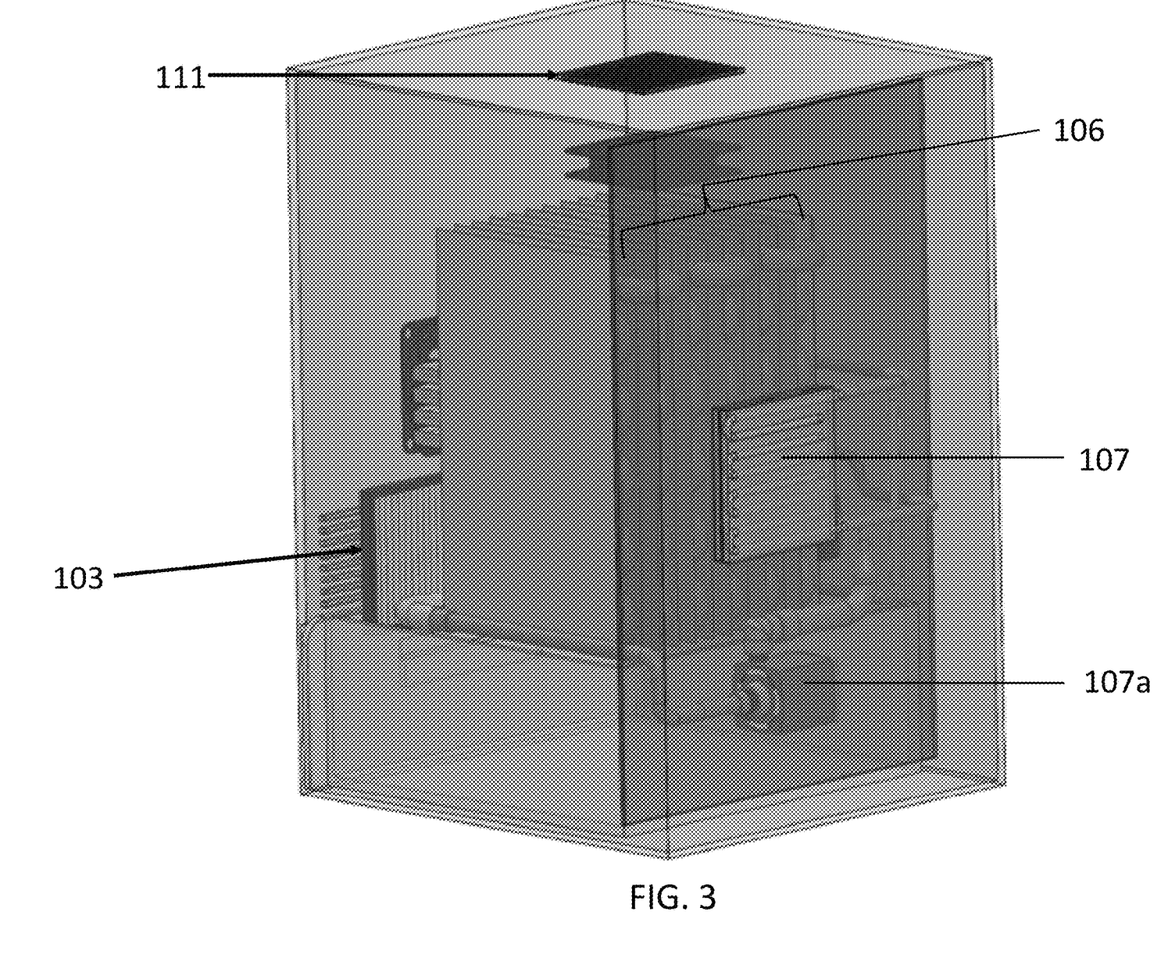
FIG. 3 is another perspective transparent view of the system according to an embodiment of the present invention.

Turning to FIGS. 2 and 3, they shows two opposite perspective views of an example of the present system, where from one side (front, rear, or one of left and right sides) the plurality of heat exchangers 106 is arranged in a way with a serpentine-shaped cross-section, which is on one end connected by a first water pipe to receive the relatively cool water from the thermoelectric heater and cooler module 107 while on the other end connected by a second water pipe to transfer the relatively warm water from the plurality of heat exchangers 106 to the thermoelectric heater and cooler module 107, and the thermoelectric heater and cooler module is configured to transfer the relatively warm water to the heat storage member 109 and receive the relatively cool water from the heat storage member 109 after the heat from the relatively warm water is absorbed by the material of the heat storage member 109. Because of the nature of the material which includes at least one phase-change material, when the temperature of the relatively warm water from the thermoelectric heater and cooler module 107 is above the phase-transition temperature of the material inside the heat storage member 109, the absorbed heat by the material of the heat storage member 109 will be transferred by an air flow generated by the ventilation fan 108 in order to convert the material from its solid state to liquid state. In some embodiments, the phase-transition temperature of the material inside the heat storage member 109 is about 40-50° C. Therefore, when the water from the thermoelectric heater and cooler module 107 is slightly above this phase-transition temperature, the phase-change material inside the heat storage member 109 will start to become liquid in order to store the heat from the incoming water. The water passing through the heat storage member 109 will be cooled and re-circulated back to the other end of the thermoelectric heater and cooler module 109 proximal to and communicated with the superhydrophilic-nanostructured composite surface where it will be in contact with the incoming process air to ensure the water re-circulated back to the liquid section of the plurality of heat exchangers 106 is below dew point temperature of the water molecules in the process air. One of the advantages of using a phase-change material to dissipate the heat from the water over the use of fresh cool air (usually at about 25-30° C.) as in the conventional cooling system of dehumidifier is that the efficiency of heat dissipation is much higher and more direct. In the present system, an additional feature which is advantageous over the conventional system is an incorporation of a ventilation fan 108 configured to be disposed in an air pathway between the plurality of heat exchangers 106 and the heat storage member 109 so that the air ventilated by the ventilation fan 108 will carry the heat away from the phase-change material and regenerate the relatively warm air to elevate the temperature around the plurality of heat exchangers such that the composite adsorbent having been partially or fully saturated with water absorbed by the compound(s) and/or chemical(s) of the composite adsorbent due to the chemical-based condensation mechanism. The dissociation of the water molecules from the composite adsorbent regenerates the compound(s) and/or chemical(s) to be capable of absorbing water molecules from the incoming process air again. A water collection member 110, in this example is a tank, is provided which is disposed underneath the plurality of heat exchangers 106 to collect the water released from the superhydrophilic-nanostructured composite surface/chemical-based adsorbents. The water collected can be re-circulated to different parts of the system.

In a preferred embodiment, the thermoelectric heater and cooler module does not include any refrigerant, but uses a thermodynamic mechanism and is run by electricity with a temperature-sensing mechanism to regulate the circulation of water between the module and the heat storage member and between the plurality of heat exchangers and the module. The circulation of water between different components in the system can also be regulated by other possible mechanisms, given that they can meet the goal of energy-saving.

In certain embodiments, the phase change materials used in the heat storage member are to store the heat generated by thermoelectric cooler for regeneration of the composite adsorbent on the superhydrophilic-nanostructured composite surface of the thermal conductive elements. The temperature of the thermoelectric cooler can reach 40-50° C., so, the phase-transition temperature of the phase change material is 40-50° C., which is higher than the temperature of the present invention, i.e. using fresh air, around 25-30° C. The higher temperature shows a better performance of the energy storage of the phase change materials. Therefore, the phase change materials can help remove a large amount of heat at the hot side of the thermoelectric cooler to maintain the service life of it, and the removed heat is stored in a heat storage tank for adsorbent regeneration. The present invention uses the thermoelectric cooler instead of a compressor, such that the present invention also has another advantage over the conventional system, which is relatively quiet. In addition, the present invention avoids using refrigerants which is harmful to the environment.

Example 1

Photo-inducible superhydrophilic $TiO_2$-containing composite surface has also been demonstrated: First, $TiO_2$ sol or the mixed solution of $TiO_2$ sol and $SiO_2$ sol was coated on the surface of substrate using air spray. The amount of solution was 3.0 g/m$^2$ by wet weight. After drying this sample at room temperature, it was calcined at 800° C. with 1-hour working time by a muffle furnace. Next, ultraviolet-ray was irradiated to the surface of the sample by commercial 20 W black light blue fluorescent light for 24 hours.

Example 2

The superhydrophilic surface can be fabricated by electrochemical deposition and sintering process. After polished by 1500$^\#$ silicon carbide paper, the copper plates were ultrasonically cleaned in acetone and deionized water for 3-5 min, respectively, then dried in air at ambient temperature. The electrolyte with 1 mol/L H$^+$ and 0.02 mol/L Cu$^{2+}$ was prepared using HCl and $CuCl_2 \cdot H_2O$. The prepared copper plates used as anode and cathode were immersed into the electrolyte at ambient temperature while a DC regulated power supply was utilized. Both electrodes were placed vertically and the deposition time ranged from 5 to 20 min. After the electrochemical deposition, the cathode copper plate was cleaned with deionized water and dried at 100° C. in a thermostatic oven for 30 min, then cooled in air to ambient temperature. Afterwards, the plate was heated at 400° C. for 30 min, then at 500° C. for another 60 min in a vacuum sintering furnace. The samples were taken out of the furnace when the temperature went back to 200° C. and placed in air to cool further.

Example 3

The superhydrophilic-nanostructured can be prepared by the dip coating method. The copper substrates were polished one side with abrasive paper with 400, 600, 800, 1000, 1200, 1500, 2000 grits in sequence. Then the copper plate was soaked in 100 ml acetone solution for 10 min. Then, the copper substrate was immersed into the pure ethanol for another 10 min. The copper substrate was then cleaned with deionized water and blow-dried with nitrogen. The substrate was immersed into 100 ml 0.0115 M of silver nitrate solution ($AgNO_3$) for 18 min. The copper substrate was then immersed in a deionized water bath and dried with low flow nitrogen. Next, the sample was placed in the 11-mercaptoundecan-1-undecano (MUD) solution with a concentration of 1 mM in the dichloromethane ($CH_2Cl_2$) for 1 hour. Last, the copper substrate was immersed into pure ethanol for 1 min, and then was dried by nitrogen.

Figure 4:
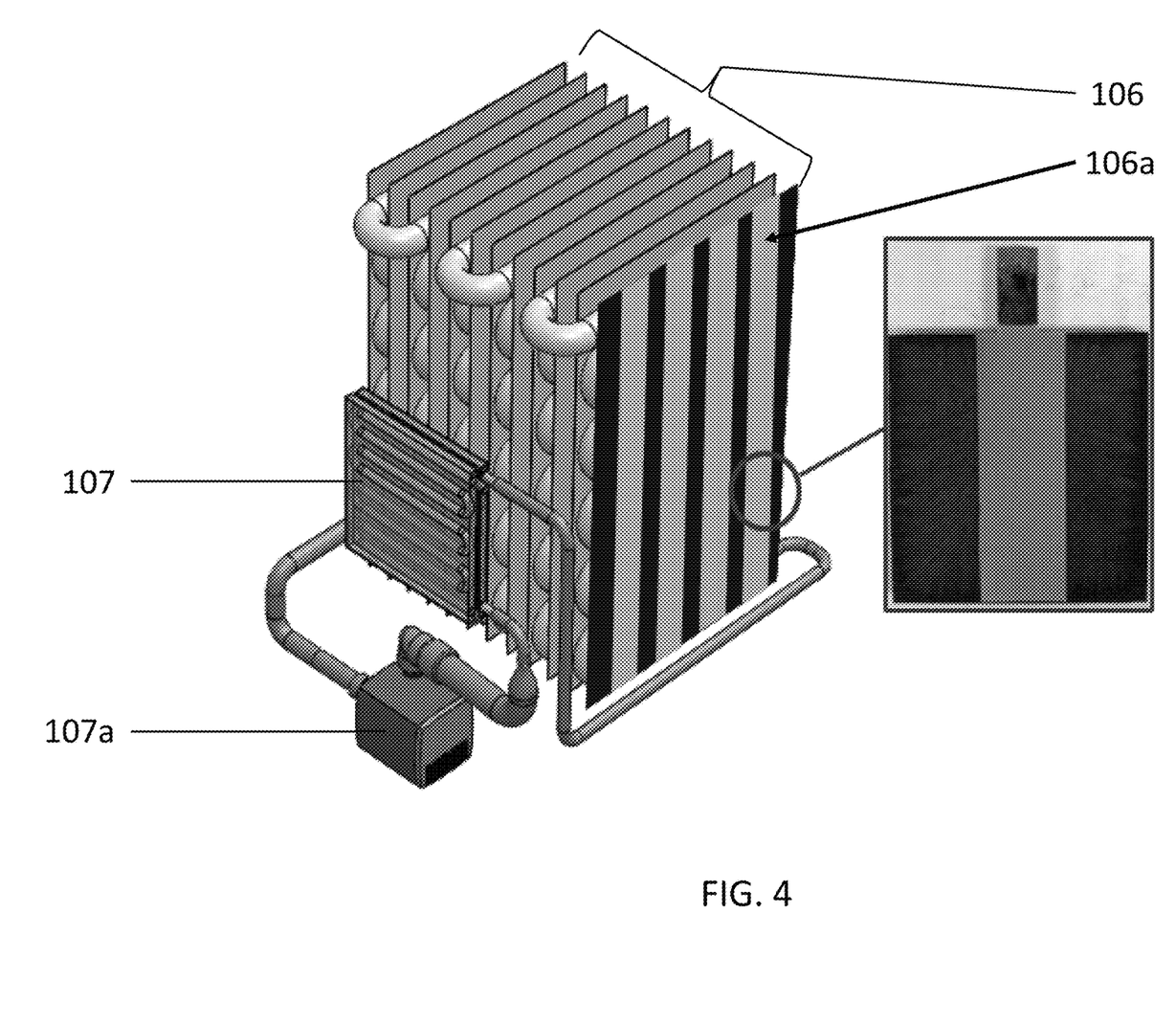
FIG. 4 is a perspective enlarged view of the plurality of the thermal conductive elements with a close-up inset depicting the superhydrophilic-nanostructured composite

The superhydrophilic surface can be formed on even a raw copper plate by using the methods mentioned in Examples 1-3, and then the composite adsorbent is sprayed on the as-prepared superhydrophilic surface by various coating methods including but not limited to electrostatic coating. FIG. 4 shows an example of a patterned composite adsorbent-coated copper plate as one of the preferred embodiments of the superhydrophilic-nanostructured composite surface of the plurality of heat exchangers of the present invention. It should be understood that the manner of coating the composite adsorbent on the superhydrophilic-nanostructured composite surface is not limited by this example, and can vary according to different applications and/or requirements in different dehumidifiers.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

INDUSTRIAL APPLICABILITY

The present invention combines two water condensation mechanisms: dew point and chemical-based condensations, and incorporates a thermoelectric water-recycling mechanism to establish at least two water circulations to fully utilize the heat absorbed and generated during the dehumidification process while incoming air from the surroundings is not just dehumidified by the present system but also regenerated from a phase-change material storage such that a synergistic effect on dehumidification is exerted. The present invention is not just useful in domestic and industrial dehumidifiers, but also for a wide range of air treatment systems which conventionally require refrigerant or equivalent to assist condensation of the moisture from the incoming air through mechanical (dew point) dehumidification. As compared to conventional condensation-based dehumidifiers, the present invention is estimated to improve at least 50% of the dehumidification performance in terms of the energy efficiency, i.e., the amount of water removed per unit of electrical energy input (L/kWh). The present invention also can reach the water removal capacity of at least 50 L/day at ambient temperature of 30° C. and 80% relative humidity.

The invention claimed is:

1. A system for removing moisture from process air comprising:
   an enclosure including at least one gas inlet and one gas outlet, the enclosure further includes:
   a plurality of thermal conductive elements having at least one superhydrophilic-nanostructured composite surface and composite adsorbent;
   at least one heat storage member;
   at least one thermoelectric heating and cooling member communicating with the plurality of thermal conductive elements and the at least one heat storage member, respectively, forming at least two water circulations within the enclosure; and
   at least one particulate air filter disposed adjacent to the at least one gas inlet;
   wherein the process air is ventilated into the system through the at least one gas inlet, and passes through the at least one particulate air filter, followed by passing through the plurality of thermal conductive elements to contact the at least one superhydrophilic-nanostructured composite surface and water adsorbent in order to effect moisture removal;
   wherein heat generated from water of the at least one thermoelectric heating and cooling member is stored in the at least one heat storage member and the heat stored in the at least one heat storage member changes the state of material in the at least one heat storage member and provides heat to the water of the at least one thermoelectric heating and cooling member;
   wherein moisture from the process air is condensed on the at least one superhydrophilic-nanostructured composite surface when the process air contacts the at least one superhydrophilic-nanostructured composite surface due to a surface temperature being below a dew point temperature and/or at least a compound of the composite adsorbent absorbs water molecules from the moisture, and water condensed on said at least one superhydrophilic-nanostructured composite surface is collected by a water collection member disposed in the enclosure due to gravity.

2. The system of claim 1, wherein the at least one superhydrophilic-nanostructured composite surface has a water contact angle of less than 10 degrees.

3. The system of claim 2, wherein the at least one superhydrophilic-nanostructured composite surface comprises at least one photo-induced compound in order to exert photocatalytic superhydrophilicity to the at least one superhydrophilic-nanostructured composite surface.

4. The system of claim 3, wherein the at least one photo-induced compound comprises titanium dioxide.

5. The system of claim 2, wherein the at least one superhydrophilic-nanostructured composite surface comprises at least a metal deposited electrochemically and sintered to exert superhydrophilicity.

6. The system of claim 5, wherein the metal comprises copper.

7. The system of claim 2, wherein the at least one superhydrophilic-nanostructured composite surface comprises at least a metal substrate developed by dip-coating.

8. The system of claim 7, wherein the metal substrate comprises a copper substrate.

9. The system of claim 1, wherein the composite adsorbent comprises carbon nanotube, zeolite, calcium chloride, silica gel, activated carbon, or any combination thereof.

10. The system of claim 9, wherein the composite adsorbent is coated on the at least one superhydrophilic-nanostructured composite surface by spraying or electrostatic coating.

11. The system of claim 1, wherein the plurality of thermal conductive elements is arranged to form tubular, shell, double pipe, hairpin, flat plate, fin, radiator, spiral structure, serpentine-shaped, or any combination thereof, to increase solid-liquid contact area of the superhydrophilic-nanostructured composite surface.

12. The system of claim 1, wherein a first ventilation fan is disposed in the enclosure along a first air pathway for ventilating the process air from outside the enclosure through the gas inlet, subsequently through the at least one particulate air filter, followed by contacting the at least one superhydrophilic-nanostructured composite surface and the composite adsorbent of the plurality of the thermal conductive elements, before the process air being discharged from the enclosure through the gas outlet to the exterior of the enclosure.

13. The system of claim 1, wherein a second ventilation fan is disposed such that hot air generated from the at least one heat storage member is directed towards the plurality of thermal conductive elements so that heat from the hot air heats the surface thereof so that water molecules absorbed by the composite adsorbent are released from the composite absorbent to the relatively colder superhydrophilic-nanostructured composite surface.

14. A self-regenerated method for removing moisture from process air comprising:

providing an enclosure where the process air is treated;

first ventilating the process air from a gas inlet of the enclosure through an air pathway to reach a plurality of thermal conductive elements;

providing a superhydrophilic-nanostructured composite surface coated with one or more chemical-based adsorbents on the plurality of thermal conductive elements to be disposed within the enclosure in an orientation substantially perpendicular to the direction of air flow in the air pathway from the gas inlet in order to maximize contact rate per surface area of the superhydrophilic-nanostructured composite surface to a volume of incoming process air;

providing a thermoelectric heater and cooler module having at least two water circulations respectively communicating with a liquid section of the plurality of the thermal conductive elements and with a heat storage member, one end of the liquid section of the thermal conductive elements more proximal to the superhydrophilic-nanostructured composite surface receiving a relatively cool water from the thermoelectric heater and cooler module while the other end of the liquid section of the thermal conductive elements more distal to the superhydrophilic-nanostructured composite surface transferring a relatively warm water to the thermoelectric heater and cooler module;

the heat storage member including a material responsive to temperature change when the temperature of the water from the thermoelectric heater and cooler module exceeds a phase-transition temperature of said material of the heat storage member such that said material is converted from solid state into liquid state;

second ventilating the air in the enclosure towards a direction which a maximum air flow rate first flowing through the heat storage member to carry away heat from said material of the heat storage member after being converted into liquid state followed by flowing through multiple gaps between each pair of two different vertical planes of the thermal conductive elements is provided to elevate the surface temperature of the superhydrophilic-nanostructured composite surface such that water molecules from the incoming process air absorbed by the one or more chemical-based adsorbents are ready to be released from the chemical-based absorbents;

after said second ventilated air passing through the material of the heat storage member having been converted from solid to liquid state thereof by the relatively warm water at a temperature exceeding the phase-transition temperature of the material from the thermoelectric heater and cooler module, transferring the water after cooling by said ventilated air from the heat storage member back to the thermoelectric heater and cooler module in order to circulate a relatively cool water to the end of the liquid section of the plurality of thermal conductive elements more proximal to the superhydrophilic-nanostructured composite surface where incoming process air after passing through the gas inlet will first contact;

cooling the superhydrophilic-nanostructured composite surface by the relatively cool water from the thermoelectric heater and cooler module to the liquid section of the plurality of the thermal conductive elements such that the proximal end of the plurality of the thermal conductive elements to the superhydrophilic-nanostructured composite surface maintains a surface temperature below a dew point temperature of the water molecules in the incoming process air.

15. The method of claim 14, wherein the air directed by said second ventilating to carry away heat from the one or more materials of the heat storage member after the materials of the heat storage member having been converted from solid to liquid state by the relatively warm water from the thermoelectric heater and cooler module is at a temperature above the dew point temperature of the water molecules in order to facilitate dissociation of the water molecules from the one or more chemical-based adsorbents coated on the superhydrophilic-nanostructured composite surface in order to regenerate the one or more chemical-based adsorbents for subsequent rounds of chemical-based condensation.

16. The method of claim 14, wherein the superhydrophilic-nanostructured composite surface is provided by electrochemical deposition or dip-coating of at least one metal to form a metal substrate, followed by electrostatic coating the one or more chemical-based adsorbents by spraying a solution containing the one or more chemical-based adsorbents or by other possible deposition method in order to form a coating of the one or more chemical-based adsorbents on the composite surface.

17. The method of claim 16, wherein the at least one metal or the metal substrate of the superhydrophilic-nanostructured composite surface is composed of copper or a copper compound.

18. The method of claim 17, wherein a copper substrate or plate is polished or electrochemically deposited with the copper compound followed by sintering to obtain the superhydrophilic-nanostructured composite surface.

19. The method of claim 16, wherein the superhydrophilic-nanostructured composite surface comprises a photocatalytic compound coated thereon after the formation of the superhydrophilic surface.

20. The method of claim 19, wherein the photocatalytic compound comprises titanium dioxide.

* * * * *